(12) United States Patent
Chae et al.

(10) Patent No.: US 7,324,184 B2
(45) Date of Patent: Jan. 29, 2008

(54) INDICATOR FOR DECIDING GRINDING AMOUNT OF LIQUID CRYSTAL DISPLAY PANEL AND METHOD FOR DETECTING GRINDING FAILURE USING THE SAME

(75) Inventors: Kyung-Su Chae, Daegu-kwangyokshi (KR); Hun-Jun Choo, Kyongsangbuk-do (KR); Jong Go Lim, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/982,796

(22) Filed: Nov. 8, 2004

(65) Prior Publication Data
US 2005/0062926 A1  Mar. 24, 2005

Related U.S. Application Data

(63) Continuation of application No. 10/125,551, filed on Apr. 19, 2002, now Pat. No. 6,825,897.

(30) Foreign Application Priority Data

Mar. 13, 2002  (KR) .................. 10-2002-013643

(51) Int. Cl.
  *G02F 1/1333* (2006.01)
(52) U.S. Cl. .................. 349/158; 349/187; 349/152
(58) Field of Classification Search ........ 349/129, 349/94, 130, 133
  See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | 29/592 R |
| 4,653,864 A | 3/1987 | Baron et al. | |
| 4,691,995 A | 9/1987 | Yamazaki et al. | 350/331 R |
| 4,775,225 A | 10/1988 | Tsuboyama et al. | |
| 5,247,377 A | 9/1993 | Omeis et al. | 359/76 |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | 141/7 |
| 5,539,545 A | 7/1996 | Shimizu et al. | |

(Continued)

FOREIGN PATENT DOCUMENTS

EP  1 003 066 A1  5/2000

(Continued)

*Primary Examiner*—Toan Ton
*Assistant Examiner*—Richard H Kim
(74) *Attorney, Agent, or Firm*—McKenna, Long & Aldridge LLP (57) ABSTRACT

An indicator for deciding a grinding amount of a liquid crystal display panel and a method for detecting grinding failure using the same are disclosed in the present invention. The indicator includes at least one alignment mark formed at a gate pad unit and a data pad unit of a liquid crystal display panel, and at least one pattern for detecting a grinding amount between a first end portion of the gate pad unit and the alignment mark, and a second end portion of the data pad unit and the alignment mark.

12 Claims, 4 Drawing Sheets

U.S. PATENT DOCUMENTS

| | | | |
|---|---|---|---|
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | 222/1 |
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | 349/190 |
| 6,016,178 A | 1/2000 | Kataoka et al. | 349/117 |
| 6,016,181 A | 1/2000 | Shimada | |
| 6,055,035 A | 4/2000 | Von Gutfeld et al. | 349/187 |
| 6,163,357 A | 12/2000 | Nakamura | 349/155 |
| 6,219,126 B1 | 4/2001 | Von Gutfeld | |
| 6,226,067 B1 | 5/2001 | Nishiguchi et al. | 349/155 |
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,414,733 B1 | 7/2002 | Ishikawa et al. | 349/110 |
| 6,496,242 B1* | 12/2002 | Moon | 349/143 |
| 6,504,596 B1* | 1/2003 | You et al. | 349/187 |
| 2001/0005256 A1 | 6/2001 | Sumi et al. | |
| 2001/0021000 A1 | 9/2001 | Egami | 349/187 |

FOREIGN PATENT DOCUMENTS

| | | |
|---|---|---|
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-054225 | 3/1987 |
| JP | 62-054229 | 3/1987 |
| JP | 63-054228 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 03-009549 | 1/1991 |
| JP | 05-036425 | 2/1993 |
| JP | 05-036426 | 2/1993 |
| JP | 05-107533 | 4/1993 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 06-018829 | 1/1994 |
| JP | 6-51256 | 2/1994 |
| JP | 06-064229 | 3/1994 |
| JP | 6-148657 | 5/1994 |
| JP | 6-160871 | 6/1994 |
| JP | 06-194637 | 7/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 07-275770 | 10/1995 |
| JP | 07-275771 | 10/1995 |
| JP | 08-076133 | 3/1996 |
| JP | 8-95066 | 4/1996 |
| JP | 8-101395 A | 4/1996 |
| JP | 8-106101 | 4/1996 |
| JP | 08-110504 | 4/1996 |
| JP | 08-136937 | 5/1996 |
| JP | 8-171094 | 7/1996 |
| JP | 08-173874 | 7/1996 |
| JP | 8-190099 | 7/1996 |
| JP | 8-240807 | 9/1996 |
| JP | 8278514 | 10/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 09-094500 | 4/1997 |
| JP | 9-127528 | 5/1997 |
| JP | 09-001026 | 7/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-174924 | 6/1998 |
| JP | 10-177178 A | 6/1998 |
| JP | 10-221700 | 8/1998 |
| JP | 10-282512 | 10/1998 |
| JP | 10-333157 A | 12/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-262712 | 9/1999 |
| JP | 11-264991 | 9/1999 |
| JP | 11-326922 A | 11/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-066218 | 3/2000 |
| JP | 2000-093866 | 4/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |

| | | | | | | |
|---|---|---|---|---|---|---|
| JP | 2001-117109 A | 4/2001 | | JP | 2002-122870 | 4/2002 |
| JP | 2001-133745 A | 5/2001 | | JP | 2002-122872 | 4/2002 |
| JP | 2001-133794 | 5/2001 | | JP | 2002-122873 | 4/2002 |
| JP | 2001-133799 A | 5/2001 | | JP | 2002-131762 | 5/2002 |
| JP | 2001-142074 | 5/2001 | | JP | 2002-139734 | 5/2002 |
| JP | 2001-147437 | 5/2001 | | JP | 2002-156518 | 5/2002 |
| JP | 2001-154211 | 6/2001 | | JP | 2002-169166 | 6/2002 |
| JP | 2001-166272 A | 6/2001 | | JP | 2002-169167 | 6/2002 |
| JP | 2001-166310 A | 6/2001 | | JP | 2002-182222 | 6/2002 |
| JP | 2001-183683 A | 7/2001 | | JP | 2002-202512 | 7/2002 |
| JP | 2001-201750 A | 7/2001 | | JP | 2002-202514 | 7/2002 |
| JP | 2001-209052 A | 8/2001 | | JP | 2002-214626 | 7/2002 |
| JP | 2001-209056 | 8/2001 | | JP | 2002-229042 | 8/2002 |
| JP | 2001-209057 | 8/2001 | | JP | 2002-236276 | 8/2002 |
| JP | 2001-209058 | 8/2001 | | JP | 2002-258299 | 8/2002 |
| JP | 2001-209060 A | 8/2001 | | JP | 2002-236292 | 9/2002 |
| JP | 2001-215459 A | 8/2001 | | JP | 2002-277865 | 9/2002 |
| JP | 2001-222017 A | 8/2001 | | JP | 2002-277866 | 9/2002 |
| JP | 2001-235758 A | 8/2001 | | JP | 2002-277881 | 9/2002 |
| JP | 2001-255542 | 9/2001 | | JP | 2002-287156 | 10/2002 |
| JP | 2001-264782 | 9/2001 | | JP | 2002-287651 | 10/2002 |
| JP | 2001-272640 A | 10/2001 | | JP | 2002-296605 | 10/2002 |
| JP | 2001-281675 A | 10/2001 | | JP | 2002-311438 | 10/2002 |
| JP | 2001-281678 A | 10/2001 | | JP | 2002-311440 | 10/2002 |
| JP | 2001-282126 A | 10/2001 | | JP | 2002-311442 | 10/2002 |
| JP | 2001-305563 A | 10/2001 | | JP | 2002-323687 | 11/2002 |
| JP | 2001-330837 A | 11/2001 | | JP | 2002-323694 | 11/2002 |
| JP | 2001-330840 | 11/2001 | | JP | 2002-333628 | 11/2002 |
| JP | 2001-356353 A | 12/2001 | | JP | 2002-333635 | 11/2002 |
| JP | 2001-356354 | 12/2001 | | JP | 2002-333843 | 11/2002 |
| JP | 2001-356357 | 12/2001 | | JP | 2002-341329 | 11/2002 |
| JP | 2002-14360 | 1/2002 | | JP | 2002-341355 | 11/2002 |
| JP | 2002-23176 | 1/2002 | | JP | 2002-341356 | 11/2002 |
| JP | 2002-49045 | 2/2002 | | JP | 2002-341357 | 11/2002 |
| JP | 2002-079160 | 3/2002 | | JP | 2002-341358 | 11/2002 |
| JP | 2002-080321 | 3/2002 | | JP | 2002-341359 | 11/2002 |
| JP | 2002-82340 | 3/2002 | | JP | 2002-341362 | 11/2002 |
| JP | 2002-90759 | 3/2002 | | KR | 2000-0035302 A | 6/2000 |
| JP | 2002-90760 | 3/2002 | | | | |
| JP | 2002-107740 | 4/2002 | | | | |

\* cited by examiner

INDICATOR FOR DECIDING GRINDING AMOUNT OF LIQUID CRYSTAL DISPLAY PANEL AND METHOD FOR DETECTING GRINDING FAILURE USING THE SAME

This is a continuation application of application Ser. No. 10/125,551, filed on Apr. 19, 2002 now U.S. Pat. No. 6,825,897, which claims the benefit of Korean Patent Application No. P2002-013643, filed on Mar. 13, 2002, both of which are hereby incorporated by reference.

BACKGROUND OF THE INVENTION

1. Field of the Invention

The present invention relates to a liquid crystal display panel, and more particularly, to an indicator for deciding a grinding amount of liquid crystal display panel and a method for detecting grinding failure using the same. Although the present invention is suitable for a wide scope of applications, it is particularly suitable for simplifying a grinding detection process in grinding a marginal portion of a unit liquid crystal display panel after cutting into the unit panels from the large mother substrate.

2. Discussion of the Related Art

Generally, a liquid crystal display (LCD) panel is cut into a plurality of unit LCD panels to improve yield. For simultaneously producing LCD panels, a plurality of thin film transistors and color filters are formed on two different mother substrates. Thereafter, the two mother substrates are attached to each other.

Conventionally, cutting of the unit LCD panel is performed through the process of forming a scribing line on the surface of the mother substrate with a wheel having a hardness higher than glass and breaking the mother substrate scribing line. The process for fabricating an LCD apparatus will be described with reference to the accompanied drawings.

Figure 1:
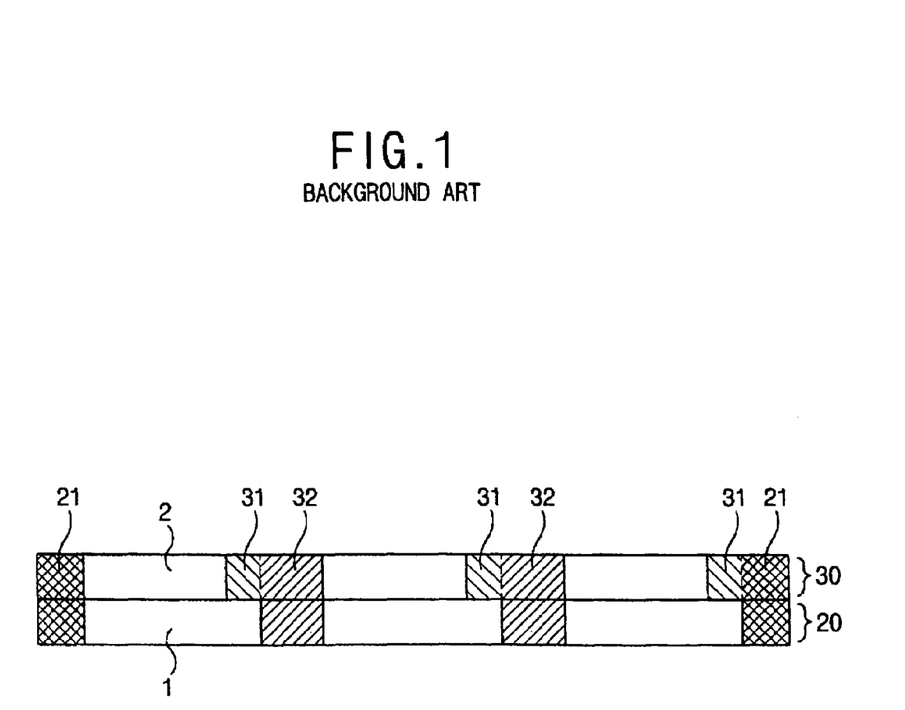
FIG. 1 is a schematic cross-sectional view illustrating that a first mother substrate including thin film transistor array substrates and a second mother substrate including color filter substrates are attached to each other for forming a plurality of liquid crystal display (LCD) panels.

FIG. 1 is a schematic cross-sectional view illustrating a first mother substrate including thin film transistor array substrates and a second mother substrate including color filter substrates. The first and second mother substrates are attached to each other, thereby forming a plurality of unit LCD panels.

With reference to FIG. 1, the unit LCD panels are formed so that one side of thin film transistor array substrates 1 is formed to be protruded more than color filter substrates 2. This is because a gate pad unit (not shown) and a data pad unit (not shown) are formed at the marginal portion of the thin film transistor array substrates 1 that do not overlap the color filter substrates 2.

Therefore, the color filter substrates 2 formed on the second mother substrate 30 are formed apart for the area of a dummy region 31 corresponding to the region where the thin film transistor array substrates 1 are protruded on the first mother substrate 20.

Also, the respective unit LCD panels are positioned to effectively utilize the first and second mother substrates 20 and 30. The unit LCD panels are formed apart for the area of the dummy region 32 depending on the model.

The first mother substrate 20 where the thin film transistor array substrates 1 are included, and the second mother substrate 30 where the color filter substrates 2 are included, are attached to each other. Thereafter, the LCD panels are cut into an individual panel. The dummy region 31, where the color filter substrates 2 of the second mother substrate 30 are formed, and the dummy region 32 for separating the unit LCD panels are simultaneously removed at this time.

After cutting the second mother substrate 30 into the unit LCD panels, a shorting line formed at the marginal portion of the thin film transistor array substrate 1 for intercepting static electricity is removed. In this process, a sharp corner of the unit LCD panel is ground. The static electricity may occur at the shorting line when a conductive film is formed on the thin film transistor array substrate 1. Also, by grinding the sharp corner of the LCD panel, pieces are not separated from the corner of the unit LCD panel by the external impact and prevent an operator from being damaged by the sharp corner of the unit LCD panel in the fabrication process.

The method for grinding the conventional unit LCD panel and a method for detecting a grinding amount will be described in detail with reference to the accompanied drawing.

Figure 2:
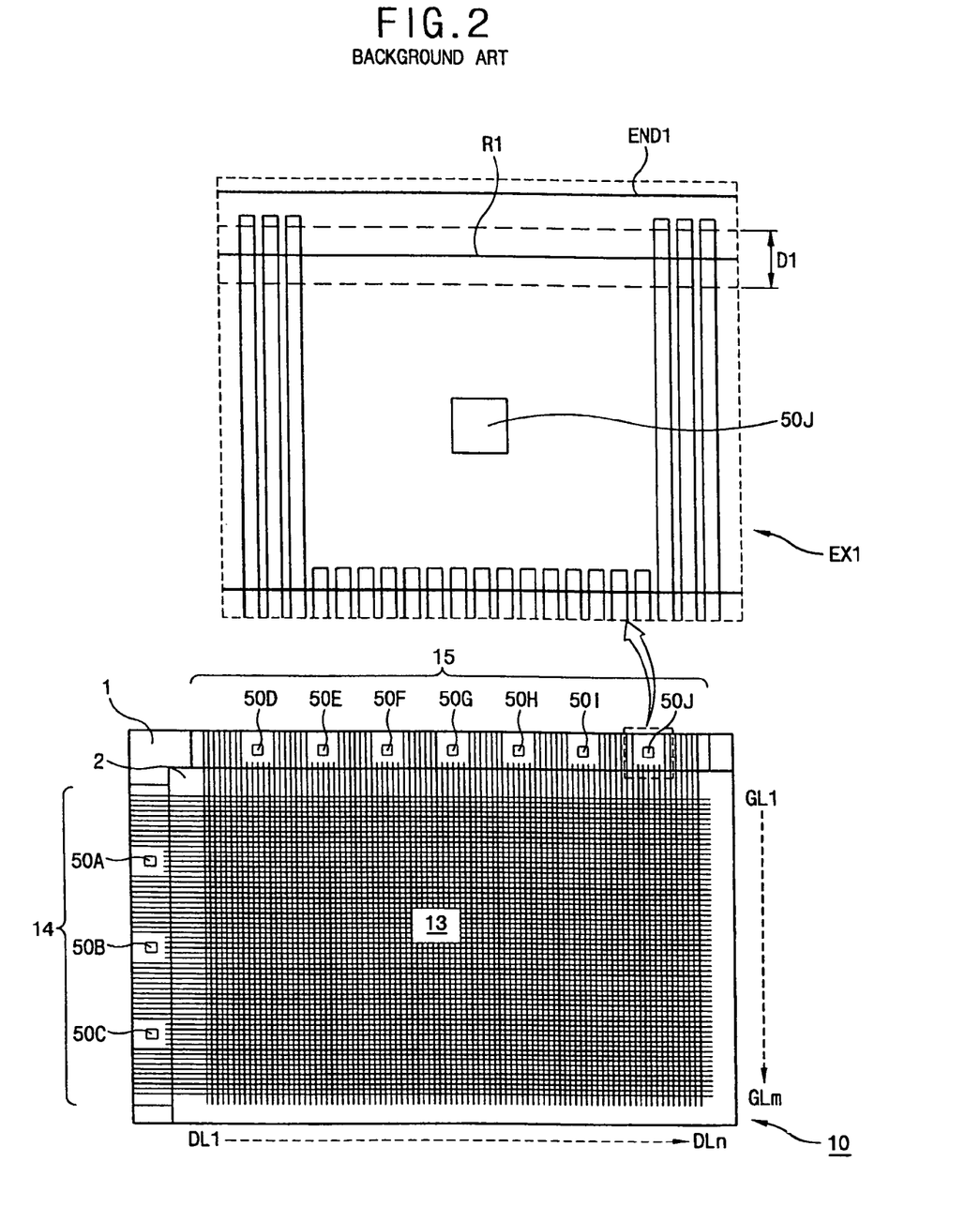
FIG. 2 is a plane view of a conventional unit LCD panel and an enlarged view of the alignment mark portion.

FIG. 2 is a schematic plane view of the conventional unit LCD panel.

With reference to FIG. 2, a unit LCD panel 10 includes a picture display unit 13 that liquid crystal cells are arranged in a matrix form, a gate pad unit 14 for connecting a plurality of gate lines GL1 to GLm of the picture display unit 13 to a gate driver integrated circuit (not shown), to which a gate signal is applied, and a data pad unit 15 for connecting a plurality of data lines DL1 to DLn of the picture display unit 13 to a data driver integrated circuit (not shown), to which the picture information is applied. The gate pad unit 14 and the data pad unit 15 are formed at the marginal portion of the thin film transistor array substrate 1 where both side edges are protruded comparing to the color filter substrate 2.

At the region where the data lines DL1 to DLn and the gate lines GL1 to GLm vertically cross one another, a thin film transistor for switching the liquid crystal cell is formed therein. A pixel electrode is formed to be connected to the thin film transistor for driving the liquid crystal cell. A passivation film is formed on the entire surface to protect the data lines DL1 to DLn, the gate lines GL1 to GLm, the thin film transistors, and the electrodes.

Also, a shorting line (not shown) for electrically shorting out the conductive films is formed at the marginal portion of the thin film transistor array substrate 1, to remove static electricity which may be generated in forming the data lines DL1 to DLn, the gate lines GL1 to GLm, and the electrodes on the thin film transistor array substrate 1.

At the color filter substrate 2 of the picture display unit 13, a plurality of color filters are coated and separated by cell regions with a black matrix. A common transparent electrode corresponding to the pixel electrode is formed at the thin film transistor array substrate 1.

A cell gap is formed between the thin film transistor array substrate 1 and the color filter substrate 2 so that the two substrates are spaced apart and face into each other. The thin film transistor array substrate 1 and the color filter substrate 2 are attached by a sealing unit (not shown) formed at the exterior of the picture display unit 13. A liquid crystal layer (not shown) is formed at the space between the thin film transistor array substrate 1 and the color filter substrate 2.

On the other hand, a plurality of tap marks 50a to 50j are formed and separated from one another for aligning the data lines DL1 to DLn, the gate lines GL1 to GLm to contact a plurality of pins of the gate driver integrated circuit and the data driver integrated circuit.

The above unit LCD panel 10 must be ground to have a sloped edge from the end of the unit LCD panel 10 to the grinding line R1, as shown in the expansion region EX1 of FIG. 2. However, the actual ground line of the unit LCD panel 10 has an error margin D1 from the grinding line R1.

When the error is beyond the error margin D1, it is determined that the grinding is defective.

To detect the failure, an operator must separate the ground unit LCD panel 10 from the production line for a predetermined period. Thereafter, an additional apparatus should be used to determine whether the actual ground line of the unit LCD panel 10 is beyond the error margin D1 by using a high magnifying power camera or a projector positioned in the measuring apparatus.

In the method for the grinding detection of the conventional liquid crystal display panel, the ground unit liquid crystal panel 10 is separated from the production line for a predetermined period. Then, the unit LCD panel is measured by using an additional apparatus to determine whether the actual ground line of the unit LCD panel 10 is beyond the error margin D1 with a high magnifying power camera or a projector positioned in the measuring apparatus.

As described previously, the operation of examining the grinding amount with the measuring apparatus, after the operator separates the unit liquid crystal panel from the production line to measure the grinding amount of the cut unit LCD panel, is complicated and inconvenient. Thus, productivity is decreased as much as the time for measuring the grinding amount of the unit LCD panel.

As a costly measuring apparatus is additionally required, installing cost as well as maintaining and repairing costs are increased, thereby increasing cost of products.

Also, since the measurement of the grinding amount is performed by sampling the unit LCD panel for a predetermined period, reliability of the examination is lowered. Also, the completed unit LCD panels may be disposed. The operation is stopped and the grinding amount of all liquid crystal display panels including unsampled panels should be measured when the grinding is defective. Accordingly, there is significant waste in raw materials and time.

SUMMARY OF THE INVENTION

Accordingly, the present invention is directed to an indicator for deciding a grinding amount of a liquid crystal display panel and a method for detecting grinding failure using the same that substantially obviates one or more of problems due to limitations and disadvantages of the related art.

Another object of the present invention is to provide an indicator for deciding a grinding amount of liquid crystal display panel and a method for detecting grinding failure using the same for simplifying a grinding detection process, in grinding the marginal portion of a unit LCD panel after cutting liquid crystal display panels fabricated on the mother substrate.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an indicator for deciding a grinding amount of a liquid crystal display panel includes at least one alignment mark formed at a gate pad unit and a data pad unit of a liquid crystal display panel, and at least one pattern for detecting a grinding amount between a first end portion of the gate pad unit and the alignment mark, and a second end portion of the data pad unit and the alignment mark.

In another aspect of the present invention, a method for detecting a grinding amount of a liquid crystal display panel includes grinding a marginal portion of a liquid crystal display panel having at least an alignment mark at a gate pad unit and a data pad unit and a pattern for detecting grinding amount between a first end portion of the gate pad unit and the alignment mark, and a second end portion of the data pad unit and the alignment mark, and deciding a grinding amount of the liquid crystal display panel by examining the pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 3:
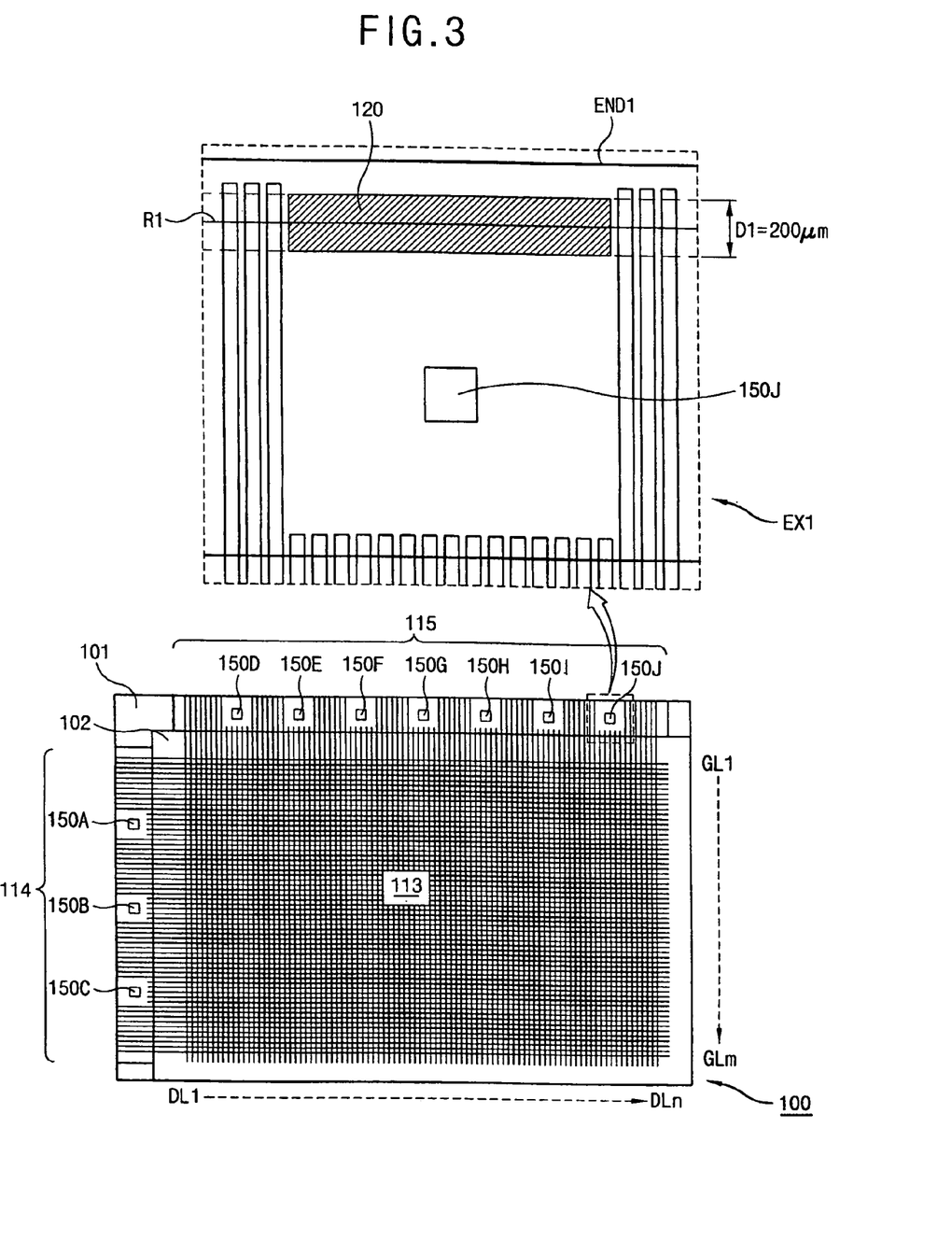
FIG. 3 is a schematic view illustrating an indicator for detecting a grinding amount of an LCD panel in accordance with a first embodiment of the present invention.

FIG. 3 is a schematic view illustrating an indicator having a pattern for detecting a grinding amount of an LCD panel in accordance with a first embodiment of the present invention.

As shown in FIG. 3, a unit LCD panel 100 includes a picture display unit 113 having liquid crystal cells arranged in a matrix form, a gate pad unit 114 for connecting a plurality of gate lines GL1 to GLm of the picture display unit 113 to a gate driver integrated circuit (not shown), to which a gate signal is applied, and a data pad unit 115 for connecting a plurality of data lines DL1 to DLn of the picture display unit 113 to a data driver integrated-circuit (not shown), to which the picture information is applied. At this time, the gate pad unit 114 and the data pad unit 115 are formed at the marginal portion of the thin film transistor array substrate 101 protruding to be longer than the color filter substrate 102.

At the region where the data lines DL1 to DLn and the gate lines GL1 to GLm vertically cross one another, a thin film transistor is formed for switching the liquid crystal cell. A pixel electrode is formed to be connected to the thin film transistor for driving the liquid crystal cell. A passivation film is formed at the entire surface to protect the data lines DL1 to DLn, the gate lines GL1 to GLm, the thin film transistors and the electrodes.

Also, a shorting line (not shown) for electrically shorting out the conductive films is formed at the marginal portion of the thin film transistor array substrate 101, to eliminate static electricity which may be generated in forming conductive films, such as a data line, a gate line, and an electrode, on the thin film transistor array substrate 101.

At the color filter substrate 102 of the picture display unit 113, a plurality of color filters are coated and separated by cell regions with a black matrix. A common transparent electrode corresponding to the pixel electrode is formed at the thin film transistor array substrate 101.

A cell gap is formed between the thin film transistor array substrate 101 and the color filter substrate 102 so that the two substrates are spaced apart and face into each other. The thin film transistor array substrate 101 and the color filter substrate 102 are attached by a sealant (not shown) formed at the exterior of the picture display unit 113. A liquid crystal layer (not shown) is formed at the space between the thin film transistor array substrate 101 and the color filter substrate 102.

On the other hand, a predetermined number of tap marks 150a to 150j are formed and separated from one another for aligning the data lines DL1 to DLn, the gate lines GL1 to GLm to contact a plurality of pins of the gate driver integrated circuit and the data driver integrated circuit. For example, as shown in FIG. 3, three tap marks 150a to 150c are formed and separated from one another at the gate pad unit 114 and seven tap marks 150d to 150j are formed to be separated from one another at the data pad unit 115.

The above unit LCD panel 100 must be ground to have a sloped edge from the end of the unit LCD panel 100 to the grinding line R1, as shown in the expansion region EX1 of FIG. 3. However, the actual ground line of the unit LCD panel 100 has an error margin D1 from the grinding line R1. Thus, when the error is beyond the error margin D1, it is determined that the grinding is defective.

Conventionally, an operator must take out the ground unit liquid crystal display panel 100 from the production line for a predetermined period. The selected liquid crystal display panel is measured with an additional apparatus to determine whether the actual ground line of the unit LCD panel 100 is beyond the error margin D1 using a high magnifying power camera or a projector positioned at the measuring apparatus.

However, in the embodiment of the present invention, as shown in FIG. 3, a pattern 120 for judging grinding amount is formed at a region corresponding to an error margin D1. A grinding line R1 is formed in the middle of the error margin D1. At this time, the error margin D1 is set to be about ±100 micrometers from the grinding line R1. It is desirable that when the pattern for judging the grinding amount 120 is formed at the gate pad unit 114, the pattern and the gate lines GL1 to GLm are formed at the same time. When the pattern for judging the grinding amount 120 is formed at the data pad unit 115, the pattern and the data lines DL1 to DLn are formed at the same time.

Therefore, whether the actual ground line of the unit liquid crystal display panel 100 is beyond the error margin D1 is determined by naked eyes.

Namely, if the observed pattern for deciding a grinding amount 120 of the completed unit LCD panel 100 is not ground at all, it should be more ground. If the observed pattern is completely ground so that no portion of the pattern remains, grinding is too excessive.

With the pattern for deciding a grinding amount of the LCD panel and a method for detecting grinding failure using the same in accordance with the first embodiment of the present invention, an additional measuring instrument is not required and the grinding failure is determined for all of the unit LCD panels 100 unlike the conventional LCD and the method thereof.

Figure 4:
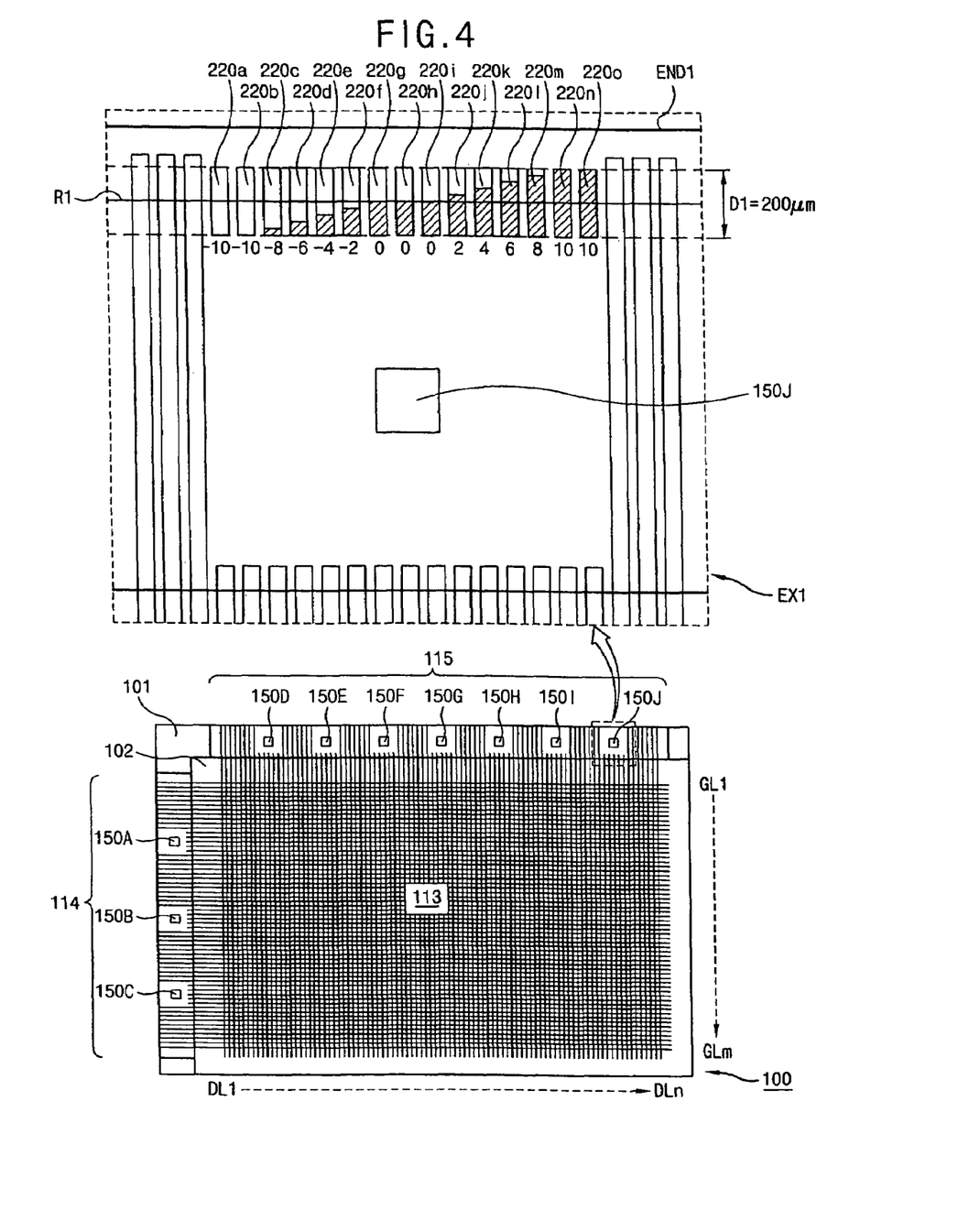
FIG. 4 is a schematic view illustrating an indicator for detecting a grinding amount of the LCD panel in accordance with a second embodiment of the present invention.

FIG. 4 is a schematic view showing an indicator having a pattern for detecting a grinding amount of the LCD panel in accordance with a second embodiment of the present invention.

The unit LCD panel 100 in FIG. 4 includes a picture display unit 113 having liquid crystal cells arranged in a matrix form, a gate pad unit 114 for connecting a plurality of gate lines GL1 to GLm of the picture display unit 113 to a gate driver integrated circuit (not shown), to which a gate signal is applied, and a data pad unit 115 for connecting a plurality of data lines DL1 to DLn of the picture display unit 113 to a data driver integrated circuit (not shown), to which picture information is applied. The gate pad unit 114 and the data pad unit 115 are formed at the marginal portion of the thin film transistor array substrate 101 having vertical and horizontal side edges from the color filter substrate 102.

At the region where the data lines DL1 to DLn and the gate lines GL1 to GLm vertically cross one another, a thin film transistor is formed for switching the liquid crystal cell. A pixel electrode is formed to be connected to the thin film transistor for driving the liquid crystal cell. A passivation film is formed at the entire surface to protect the data lines DL1 to DLn, the gate lines GL1 to GLm, the thin film transistors, and the electrodes.

Also, a shorting line (not shown) for electrically shorting out the conductive films is formed at the marginal portion of the thin film transistor array substrate 101 to remove static electricity which may be generated in forming conductive films, such as a data line, a gate line, and an electrode on the thin film transistor array substrate 101.

At the color filter substrate 102 of the picture display unit 113, a plurality of color filters formed to be separated by cell regions with a black matrix and a common transparent electrode corresponding to the pixel electrode are formed at the thin film transistor array substrate 101.

A cell gap is formed between the thin film transistor array substrate 101 and the color filter substrate 102 so that the two substrates are spaced apart and face into each other. The thin film transistor array substrate 101 and the color filter substrate 102 are attached to each other by a sealant (not shown) formed at an exterior of the picture display unit 113. A liquid crystal layer (not shown) is formed at the space between the thin film transistor array substrate 101 and the color filter substrate 102.

A plurality of tap marks 150a to 150j are formed separated from one another for aligning the data lines DL1 to DLn, the gate lines GL1 to GLm to contact a plurality of pins of the gate driver integrated circuit and the data driver integrated circuit. For example, as shown in FIG. 4, three tap marks 150a to 150c may be formed and separated apart at the gate pad unit 114 and seven tap marks 150d to 150j are formed separated regularly at the data pad unit 115.

The above unit LCD panel 100 must be ground to have a sloped edge from the end END1 of the unit LCD panel 100 to the grinding line R1, as shown in the expansion region EX1 of FIG. 3. The actual ground line of the unit LCD panel 100 may have an error margin D1 from the grinding line R1. When the actual ground line is outside the error margin D1, it is determined that the grinding is defective.

In a second embodiment of the present invention, a plurality of patterns 220a to 220o for detecting a grinding amount are formed to be apart at the region of the error margin D1 including the grinding line R1 in the middle of the error margin region.

The patterns 220a to 220o for detecting a grinding amount are examined by naked eyes by dividing the distance, such as about ±100 micrometers from the grinding line R1 in the middle of the error margin region D1, into a constant scale. Thus, the patterns may have a width of about 200 micrometers.

For instance, as shown in FIG. 4, when three patterns 220g to 220i for detecting a grinding amount are formed at the central portion, the first region is in the direction to the end END1 of the unit LCD panel 100 and the second region is in the direction to the tap mark 150j. The first and second regions are divided by the grinding line R1.

The first region having the patterns 220b to 220f for detecting a grinding amount is formed to be closer to the tap mark 150j. The pattern 220a, which is the same as the pattern 220b, is formed at the furthermost from the central patterns 220g to 220i.

The second region having the patterns 220j to 220n for detecting a grinding amount is formed to be closer to the end END1 of the unit LCD panel 100 at a constant distance level. Similarly, the pattern 220o, which is the same as the pattern 220n, is formed at the furthermost from the central patterns 220g to 220i.

The patterns 220a and 220o formed at the furthermost outside are formed for a reliable decision on grinding failure while the three patterns 220g to 220i formed at the central portion are to determine whether the actual ground line and the grinding line R1 of the unit LCD panel 100 are identical with each other.

The actual ground amount of the unit LCD panel 100 may be detected by a plurality of displaying marks. For example, numerical symbols such as (−10, −8, −6, −4, −2, −0, 2, 4, 6, 8, 10) may be used at a constant scale at the marginal portion of the region where the tap mark 150j is formed corresponding to the patterns 220a to 220o. If the error margin D1 is about ±100 micrometers from the grinding line R1, the scale of the number (−10, −8, −6, −4, −2, −0, 2, 4, 6, 8, 10) is about 10 micrometers.

In accordance with a second embodiment of the present invention, it can be determined whether the actual ground line of the unit LCD panel 100 is beyond the error margin D1 through the examination with naked eyes.

For example, when the patterns 220a and 220b at the side marginal portion are not observed and the patterns 220a to 220o of the completed unit LCD panel 100 are observed, it is determined to be defective because grinding is excessive. Conversely, when the patterns 220a and 220o at the other side marginal portion are not ground at all, it is determined to be defective because more grinding is needed.

The actual ground line and the grinding line R1 of the unit LCD panel 100 may be checked by the examination with naked eyes. Moreover, the actual ground amount of the unit LCD panel 100 may be detected within an error margin of about 20 micrometers by checking the numbers (−10, −8, −6, −4, −2, −0, 2, 4, 6, 8, 10) corresponding to the patterns 220a to 220o with a high magnifying power camera.

The error margin of about 20 micrometers may be reduced when the divided region is formed to have more patterns 220a to 220o, thereby forming more minute scales.

Therefore, when the error margin D1 is initially set to be about ±100 micrometers from the grinding line R1 and then changed to about ±80 micrometers, an operation can still be performed by checking the numbers (−10, −8, −6, −4, −2, −0, 2, 4, 6, 8, 10) corresponding to the patterns 220a to 220o with a high magnifying power camera according to the second embodiment of the present invention.

Therefore, according to the present invention, productivity is improved because the operator does not have to take out the unit LCD panel from the production line for examining the grinding amount of the cut unit LCD panel to measure the grinding amount. Also, since a measuring apparatus is not required, installing cost and maintaining and repairing costs are reduced.

Moreover, since the grinding failure for all unit LCD panels can be determined by a simple examination with naked eyes, reliability of the examination is improved unlike the conventional method requiring to take out the unit LCD panel for a period of time.

Conventionally, when a grinding failure occurs, the fabrication process must be stopped to examine the entire panel including both the-sampled and unsampled panels. Therefore, some completed unit panels may have to be disposed due to the grinding failures. Accordingly, there is a significant waste of raw materials and time. However, the present invention prevents the above problems by inspecting the entire unit on the manufacturing line.

By using the pattern for deciding a grinding amount of the LCD panel and the method for detecting a grinding failure using the same, the detecting process is performed without any difficulty when the error margin becomes narrow, because the actual ground amount of the unit LCD panel is detected with the numbers corresponding to the pattern for judging the grinding amount.

It will be apparent to those skilled in the art that various modifications and variations can be made in the indicator for deciding a grinding amount of a liquid crystal display panel and the method for detecting grinding failure using the same of the present invention without departing from the spirit or scope of the inventions. Thus, it is intended that the present invention covers the modifications and variations of this invention provided they come within the scope of the appended claims and their equivalents.

What is claimed is:

1. A method for deciding a grinding amount of a liquid crystal display panel, comprising:

grinding a marginal portion of a liquid crystal display panel having at least a tap alignment mark at a gate pad unit and a data pad unit and a pattern for deciding a grinding amount between a first end portion of the gate pad unit and the tap alignment mark, or a second end portion of the data pad unit and the tap alignment mark; and deciding a grinding amount of the liquid crystal display panel by examining the pattern.

2. The method of claim 1, wherein the liquid crystal display panel has a plurality of gate and data lines.

3. The method of claim 1, wherein the pattern in the gate pad unit and the gate lines is formed at the same time.

4. The method of claim 1, wherein the pattern in the data pad unit and the data lines is formed at the same time.

5. The method of claim 1, wherein the grinding amount is optimum at the middle of the pattern in a grinding direction.

6. The method of claim 5, wherein the pattern has a width within an error margin of the grinding amount.

7. The method of claim 6, wherein the error margin is about ±100 micrometers from the middle of the pattern.

8. The method of claim 1, wherein the pattern is formed to have a discontinued shape.

9. The method of claim 1, wherein the pattern is divided into first and second regions along an optimum grinding line.

10. The method of claim 9, wherein the first region is closer to the end of the liquid crystal display panel from the optimum grinding line than the second region.

11. The method of claim 9, wherein the second region is closer to the tap alignment mark from the optimum grinding line than the first region.

12. The method of claim 9, wherein the pattern is distinguished by a mark displayed under the second region.

* * * * *